United States Patent
Klukowski

(10) Patent No.: US 7,731,235 B2
(45) Date of Patent: Jun. 8, 2010

(54) STEERING COLUMN FOR A MOTOR VEHICLE

(75) Inventor: Christoph Klukowski, Walenstadt (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 5 days.

(21) Appl. No.: 12/232,598

(22) Filed: Sep. 19, 2008

(65) Prior Publication Data

US 2009/0033082 A1    Feb. 5, 2009

(51) Int. Cl.
    *B62D 1/11* (2006.01)
(52) U.S. Cl. .................................. 280/777; 280/775
(58) Field of Classification Search .................. 280/777, 280/779, 775; 74/493
    See application file for complete search history.

(56) References Cited

U.S. PATENT DOCUMENTS

| | | | |
|---|---|---|---|
| 6,152,488 A | 11/2000 | Hedderly et al. | |
| 6,296,280 B1 | 10/2001 | Struble et al. | |
| 6,349,967 B1 * | 2/2002 | Cartwright | 280/775 |
| 6,623,364 B2 * | 9/2003 | Badolato et al. | 464/127 |
| 6,752,425 B2 * | 6/2004 | Loh et al. | 280/779 |
| 7,165,786 B1 * | 1/2007 | Sha et al. | 280/775 |
| 7,198,297 B2 * | 4/2007 | Satou et al. | 280/777 |
| 7,297,290 B2 * | 11/2007 | Fuchs et al. | 252/62.54 |
| 7,392,876 B2 | 7/2008 | Browne et al. | |
| 2003/0037997 A1 * | 2/2003 | Sakata | 188/71.5 |
| 2004/0126565 A1 * | 7/2004 | Naganathan et al. | 428/323 |
| 2004/0150207 A1 * | 8/2004 | Satou | 280/777 |
| 2006/0125291 A1 * | 6/2006 | Buravalla et al. | 296/204 |
| 2008/0302024 A1 * | 12/2008 | Browne et al. | 52/1 |

(Continued)

FOREIGN PATENT DOCUMENTS

DE    102 00 826    5/2003

(Continued)

OTHER PUBLICATIONS

International Search Report issued Jun. 29, 2007 in the International (PCT) Application of which the present application is the U.S. National Stage.

(Continued)

*Primary Examiner*—Paul N Dickson
*Assistant Examiner*—Karen Jane J Amores
(74) *Attorney, Agent, or Firm*—Wenderoth, Lind & Ponack L.L.P.

(57) ABSTRACT

Steering column for a motor vehicle with
  a rotatably supported steering spindle (1),
  a supporting unit (4) supporting the steering spindle (1) and
  a mounting unit (5) for securing the steering spindle (1) on the chassis of the motor vehicle, the supporting unit (4) in the event of a crash being displaceable with respect to the mounting unit (5), and
  an energy absorption device (18) acting between the supporting unit (4) and mounting unit (5) for the energy absorption in the displacement of the supporting unit (4) with respect to the mounting unit (5) in the event of a crash being provided, characterized in that
  at least one energy absorption part (34) of the energy absorption device (18) deformable in the displacement of the supporting unit (4) with respect to the mounting unit (5) is composed of a magnetorheological elastomer and that the energy absorption device (18) includes a means for the generation of a magnetic field, by means of which the energy absorption part (34) composed of the magnetorheological elastomer can be acted upon at least regionally with a variable magnetic field.

20 Claims, 9 Drawing Sheets

U.S. PATENT DOCUMENTS

Figure 1:
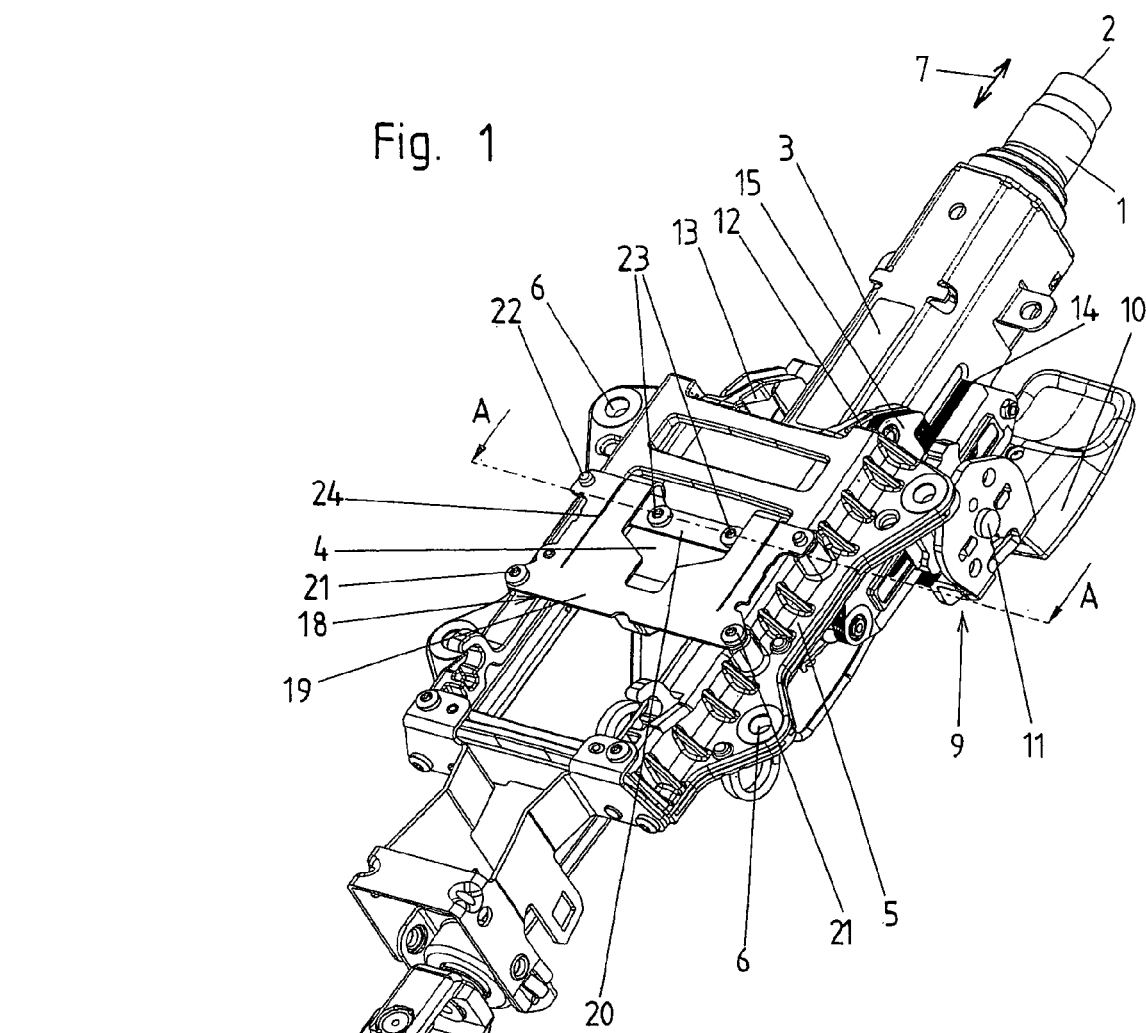

| | | | |
|---|---|---|---|
| 2008/0318045 A1* | 12/2008 | Bose et al. | 428/402 |
| 2009/0021048 A1* | 1/2009 | Melz et al. | 296/187.12 |
| 2009/0033082 A1* | 2/2009 | Klukowski | 280/777 |

FOREIGN PATENT DOCUMENTS

| | | |
|---|---|---|
| DE | 103 15 642 | 11/2004 |
| DE | 10 2004 009 726 | 9/2005 |
| DE | 10 2005 025 631 | 1/2006 |
| DE | 10 2004 041649 | 3/2006 |
| EP | 0 633 180 | 11/1996 |
| EP | 1 060 974 | 12/2000 |
| EP | 1 083 109 | 3/2001 |
| WO | 01/32494 | 5/2001 |
| WO | 02/12049 | 2/2002 |

OTHER PUBLICATIONS

Kankanala et al., "On finitely strained magnetorheological elastomers", *Journal of the Mechanics and Physics of Solids*, Vo. 52, pp. 2869-2908 (2004).

Farshad et al., "Magnetoactive elastomer composites" *Polymer Testing*, Vo. 23, 347-353 (2004).

Farshad et al., "Compression properties of magnetostrictive polymer composite gels", *Polymer Testing*, Vo. 24, pp. 163-168 (2005).

\* cited by examiner

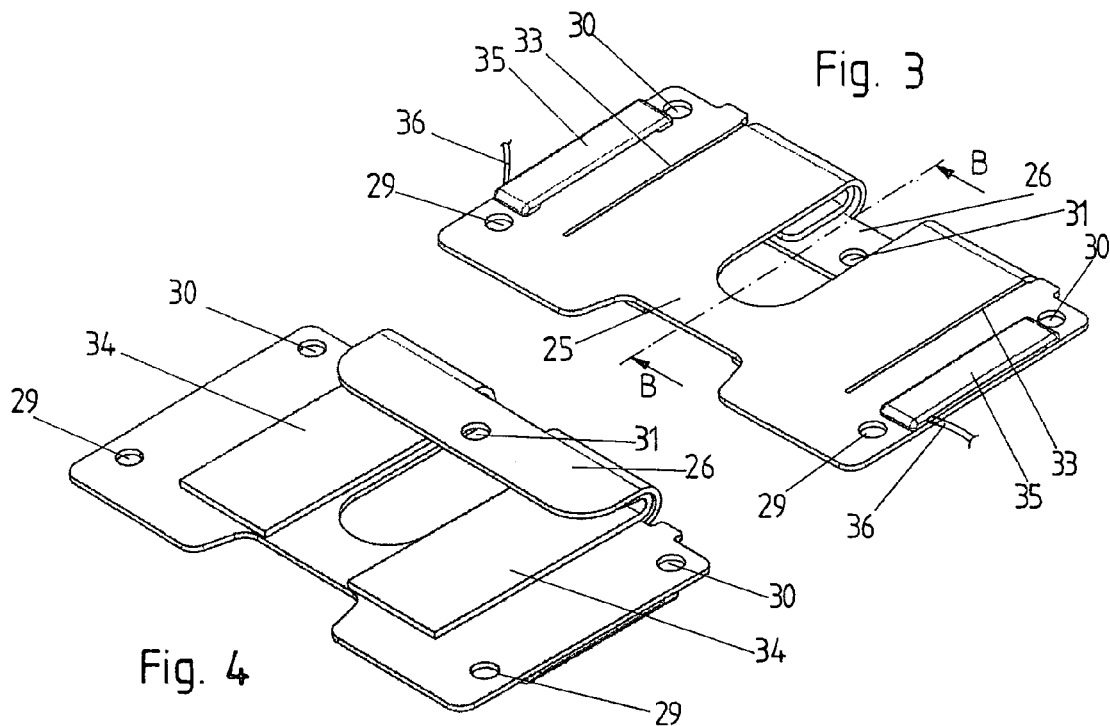
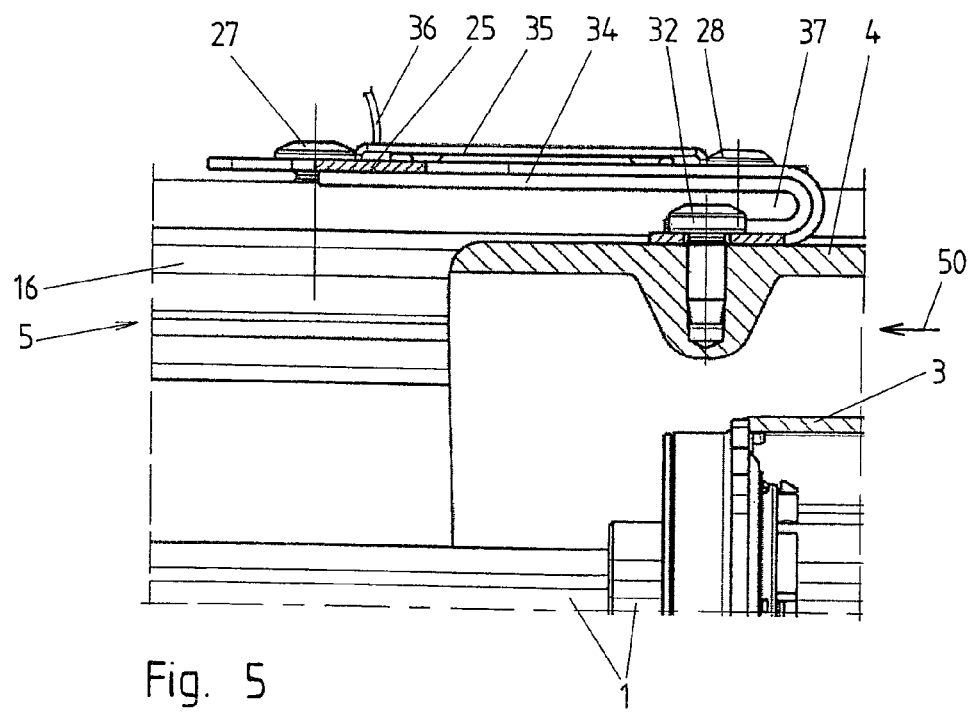

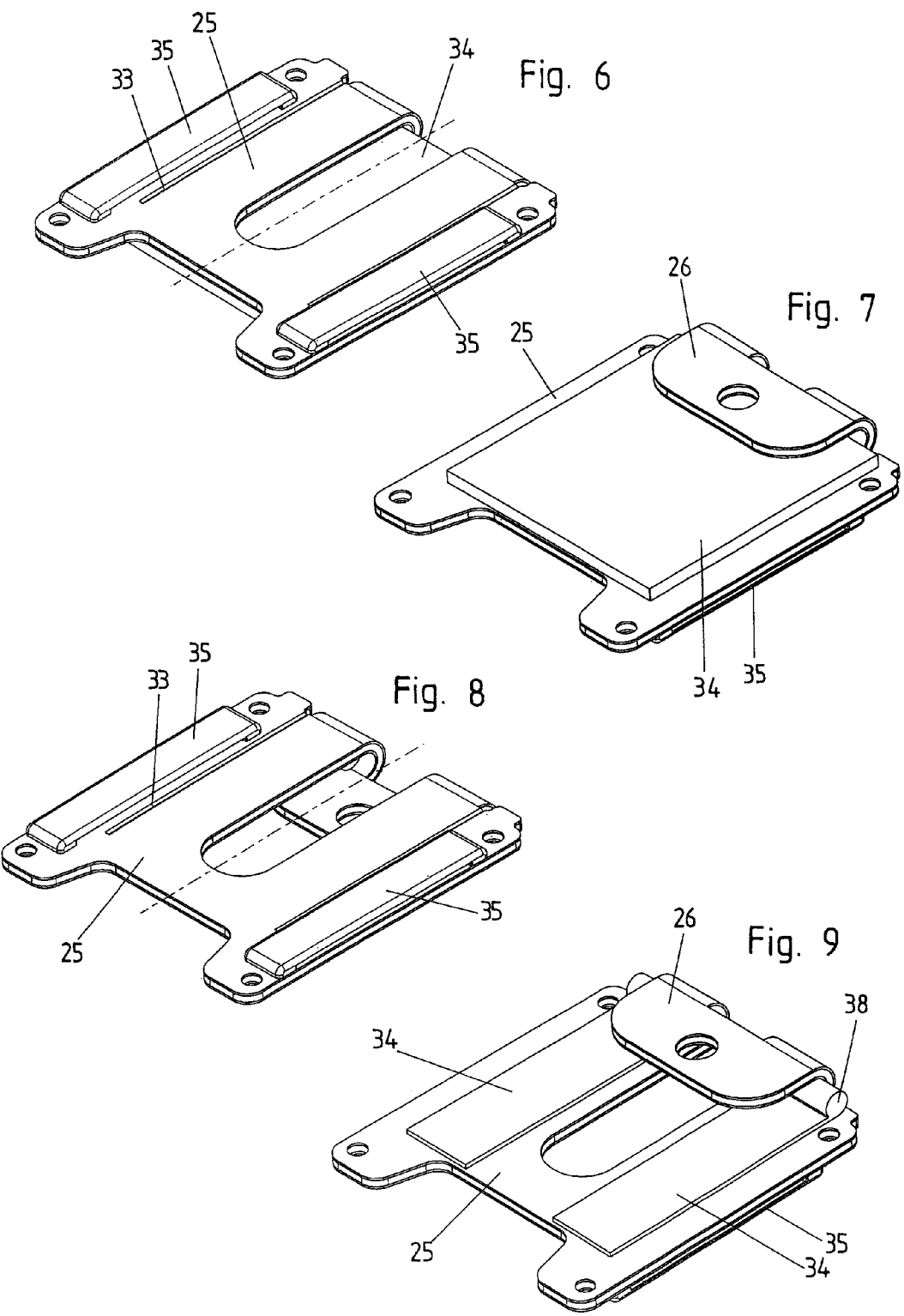

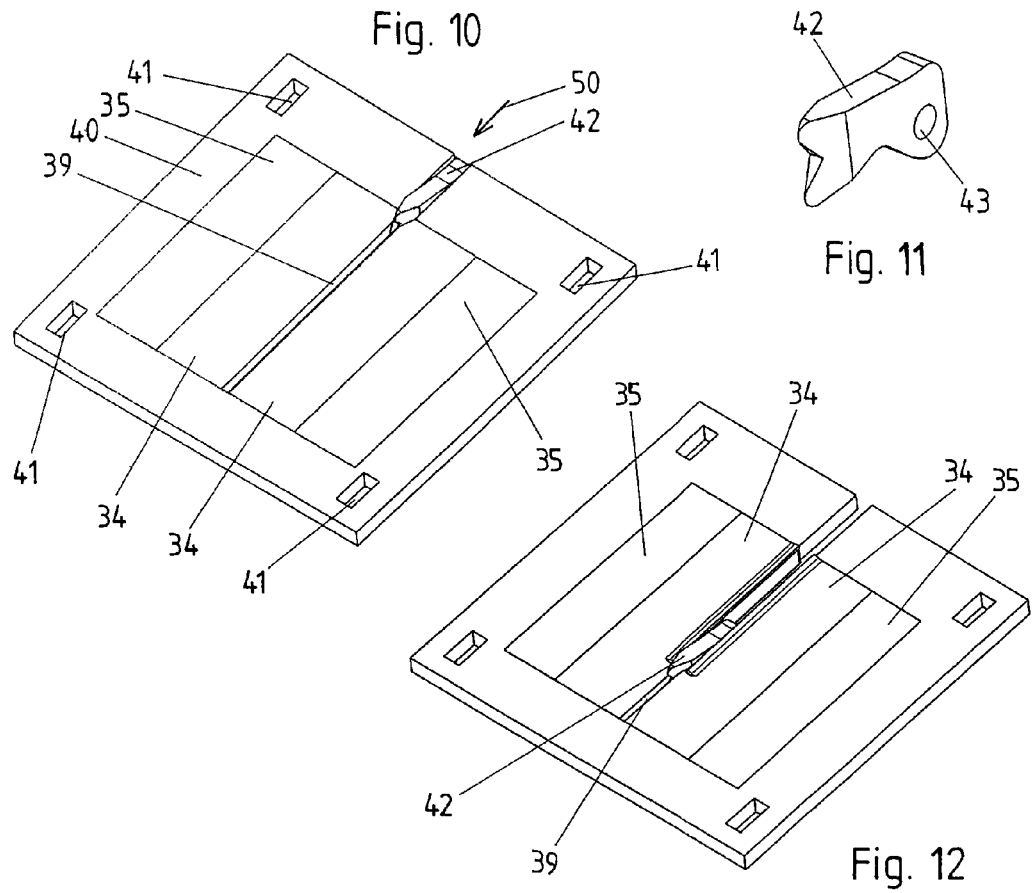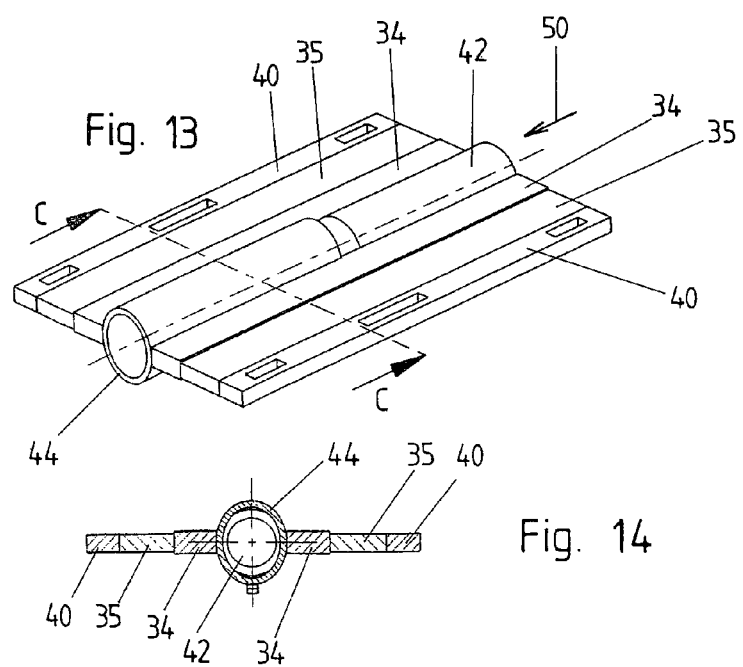

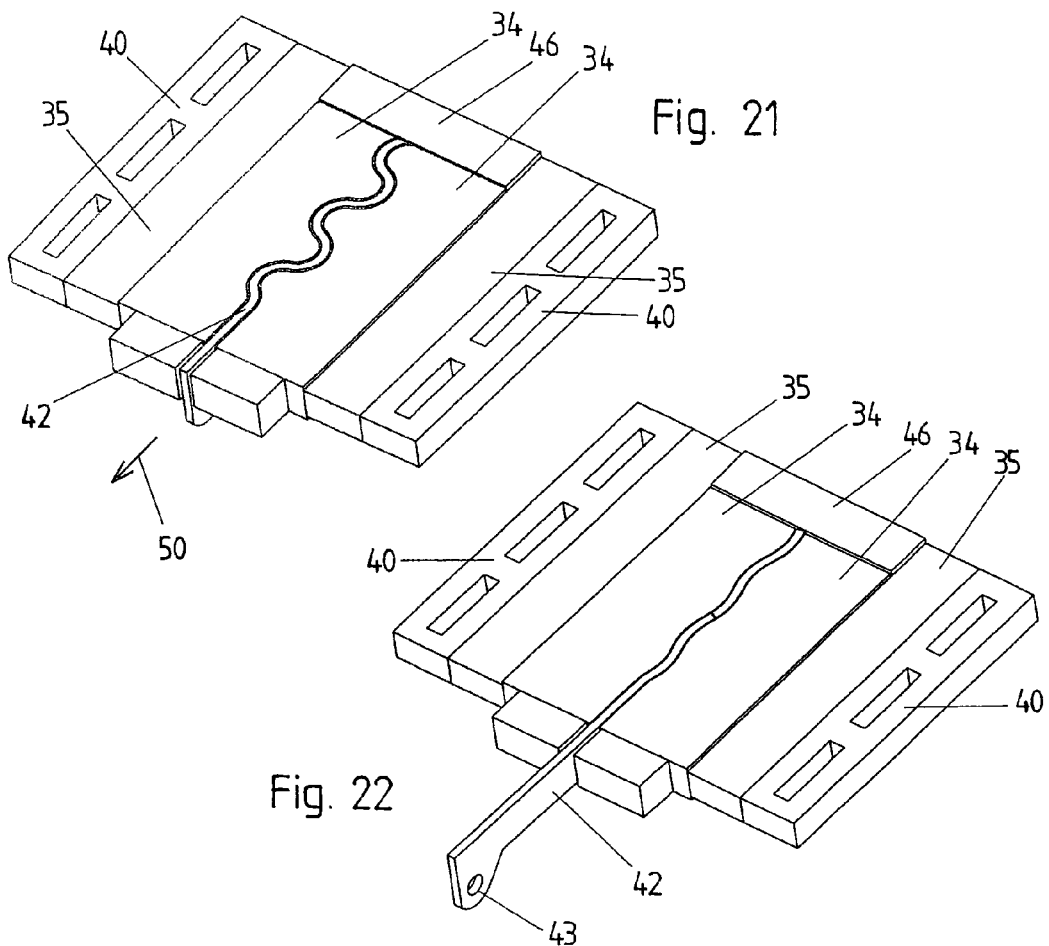
Fig. 21
Fig. 22
Fig. 23
Fig. 24
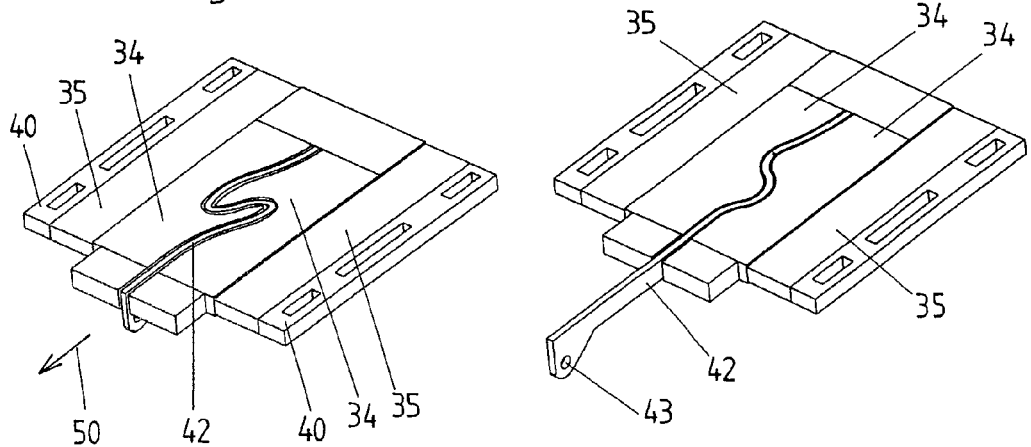

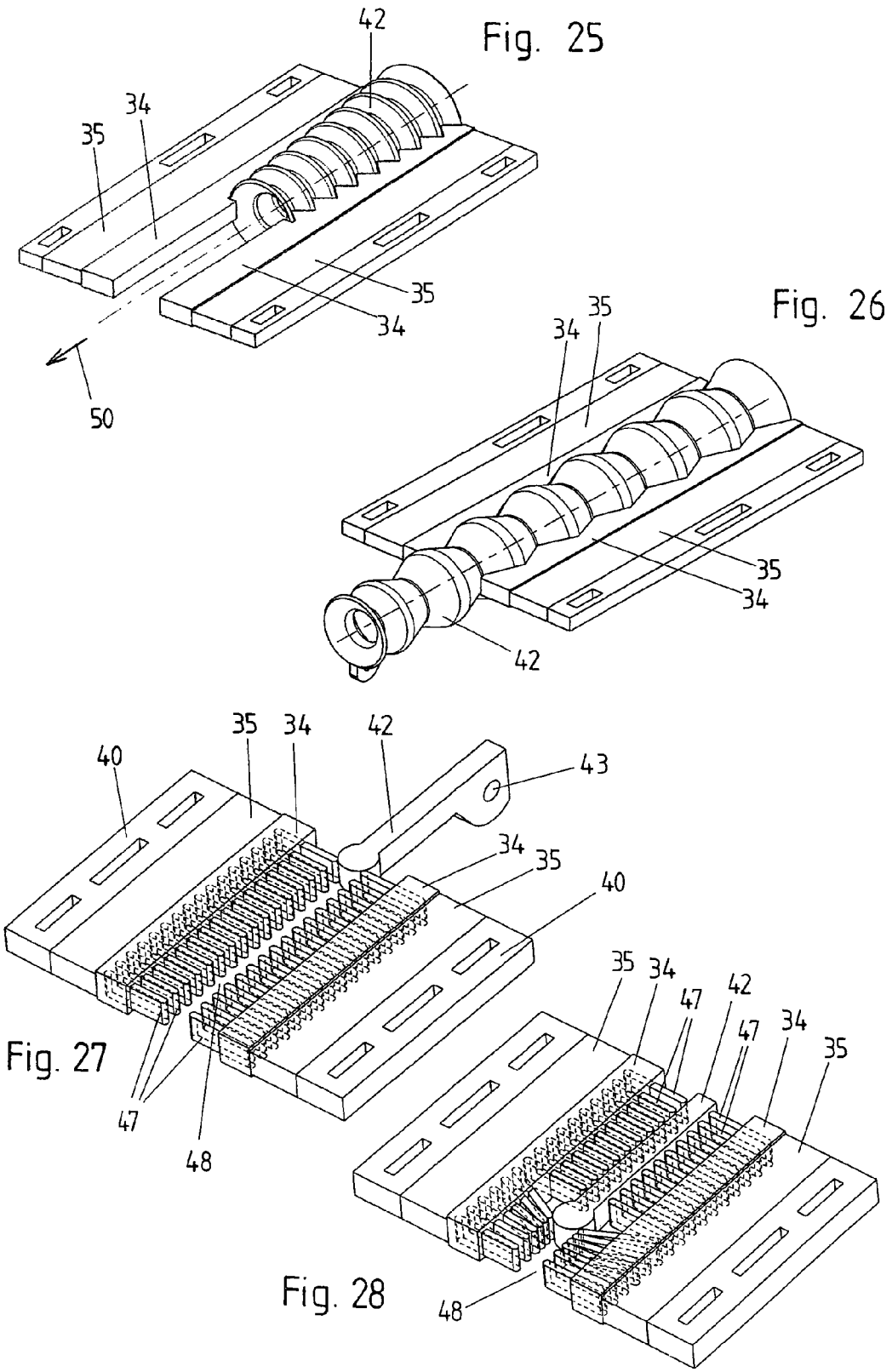

STEERING COLUMN FOR A MOTOR VEHICLE

The invention relates to a steering column for a motor vehicle with a rotatably supported steering spindle, a supporting unit supporting the steering spindle and a mounting unit for securing the steering spindle in position on the chassis of the motor vehicle, with the supporting unit being displaceable with respect to the mounting unit in the event of a crash, and an energy absorption device acting between the supporting unit and the mounting unit is provided for energy absorption during the displacement of the supporting unit with respect to the mounting unit in the event of a crash.

Steering columns of motor vehicles today must have the safety function of being capable of collapsing in the event of a motor vehicle crash. For this purpose, the end section of the steering column supporting the steering wheel must be displaceable in the direction away from the driver. During this displacement, energy is to be absorbed in a controlled manner. The steering column acts herein as a buffer which decelerates the driver over a maximally available crash path. A portion of the kinetic energy of the driver is thereby absorbed by the steering column.

In a conventional steering column of this type, the steering spindle is rotatably supported in a jacket tube supported by a supporting unit. In the opened state of a clamping apparatus the jacket tube is height-displaceable with respect to the supporting unit, to some extent also in the axial direction of the steering spindle, in order to be able to adjust the position of the steering wheel (comfort function of steering column). In the closed state of the clamping apparatus the adjusted position is fixed in position as much as possible even in the event of a crash. The supporting unit is guided displaceably in the manner of a sled in a mounting unit in the longitudinal direction of the steering spindle. The mounting unit serves for securing the steering column in position on the chassis of the motor vehicle. Between the mounting unit and the supporting unit acts an energy absorption device for the absorption of the energy in the displacement of the supporting unit with respect to the mounting unit in the event of a crash. During normal operation this energy absorption device prevents such a displacement between the supporting unit and the mounting unit. The energy absorption device comprises, for example, an energy absorption part in the form of a bent-over sheet metal strip, which is fastened, on the one hand, on the supporting unit, on the other hand, on the mounting unit. In the event of a crash, energy is absorbed through the bending work of the sheet metal strip. The sheet metal strip can optionally have tear-open lines along which tearing open occurs in the event of a crash, wherein further energy is absorbed. Such a tear bending strap can absorb a relatively large amount of energy and the energy absorption (especially for the bending) in terms of force level is well reproducible and well settable through the variation of the sheet metal thickness.

Such a steering column absorbing energy in the event of a crash is conventionally laid out for an adult male weighing approximately 78 kg and having his seat belt fastened. For lighter or heavier weight drivers, consequently, no optimal impact protection is attained. Additional important effect quantities and factors, such as for example wearing or not wearing of a safety belt, positioning of the steering wheel, seating position, impact angle and motor vehicle speed, cannot be taken into consideration.

Further known already is an energy absorption part whose energy absorption can be set in two stages, and specially by means of a pyrotechnical element from which a pin can be pulled, wherein in the emplaced and pulled-out state of the pin different deformations of the energy absorption part can occur in the event of a crash. Thereby adaptation can be attained depending on whether or not the driver has fastened his seat belt.

Known are further energy absorption devices in which a slot in a deformation part is widened by means of a bolt penetrating the slot, if in the event of a crash a displacement of the bolt occurs with respect to the deformation parts, cf. for example EP 0 633 180 B1 and EP 1 083 109 A2.

EP 1 060 974 B1 and DE 10 2004 009 726 A1 furthermore propose hydraulically acting damping for the energy absorption during the telescoping of a steering column in the event of a crash. For setting the energy absorption serves an opening electronically variable in size, through which opening flows the damping fluid, or the viscosity of the damping fluid is varied for this purpose. To this end, magnetorheological or electrorheological fluids are employed, in which the viscosity can be changed thereby that onto the fluid acts a magnetic or electric field of different strength. However, hydraulic damping systems are of disadvantage inter alia in view of their costs.

DE 102 00 826 C1 describes a steering module for a steer-by-wire steering system of a motor vehicle. The steering wheel is here connected with the piston rod of a piston disposed in a cylinder chamber. For changing the force with which the piston is displaceable in the cylinder chamber, the cylinder chamber can be filled with a magnetorheological or electrorheological fluid whose viscosity can be affected by means of a magnetic or electric field.

It has further been already proposed to employ fluids whose viscosity can be affected by a magnetic or electric field for clamping mechanisms of adjustable steering columns, through which the set position of the steering column can be fixed (DE 103 15 642 A1 and WO02/12049 A1).

DE 10 2005 025 631 A1 discloses a hood assembly of a motor vehicle utilizing mechanisms based on active materials. As active materials are listed inter alia alloys with (shape) memory function (SMA), magnetic alloys with memory function, polymers with (shape) memory function (SMP), piezoelectric materials, electro-active polymers (EAP), magnetorheological fluids and elastomers (MR) and electrorheological fluids (ER). The active material is set into an energy-absorbing cushion of the hood assembly. Such a hood assembly relates to a motor vehicle part located outside of the passenger compartment of the motor vehicle, in which the risk of injury caused by an impact is to be decreased especially for pedestrians. Entirely different requirements are made of such hood assemblies than of steering columns for motor vehicles.

The invention addresses the problem of providing a steering column of the type described in the introduction, in which the energy absorption of the energy absorption device acting between the supporting unit and the mounting unit is adaptable, for example to the weight of the driver. This is attained according to the invention through a steering column with the characteristics of claim 1.

The energy absorption device acting between the supporting unit and the mounting unit consequently includes at least one energy absorption part of a magnetorheological elastomer, which, in the event of a crash, is deformed in a displacement between the supporting unit and the mounting unit. Through this deformation, energy is absorbed. The elasticity of the energy absorption part can herein be varied through a magnetic field of greater or lesser strength, which acts onto the energy absorption part. The energy absorption of the energy absorption device can thereby be adapted, for example in view of the weight of the driver and/or further effect quantities and factors.

Through the invention is provided a steering column, which, with respect to its energy absorption, is adaptive and which can be implemented simply and cost-effectively. For the energy absorption good reproducibility and long-term stability can be attained.

In an advantageous embodiment of the invention the at least one energy absorption part composed of a magnetorheological elastomer is bent during its deformation in the event of a crash. The energy absorption part can herein advantageously be implemented in the form of a plate or in the form of a strip extending in the longitudinal direction of the steering spindle, wherein the bending takes place about a bending axis transversely to the longitudinal direction of the steering spindle. For this purpose the energy absorption part is connected directly or indirectly, on the one hand, with the supporting unit, on the other hand, with the mounting unit. The energy absorption part composed of the magnetorheological elastomer is preferably attached on an, in particular, plate-shaped support part, which is connected, on the one hand, with the supporting unit and, on the other hand, with the mounting unit, wherein the support part and the energy absorption part are bent jointly. The bending axis, preferably located at right angles to the steering spindle, can herein shift during the displacement of the supporting unit with respect to the mounting unit (in the case of a "free bending") or remain stationary with respect to one of the two units, wherein the support part with the at least one energy absorption part is pulled by the other of the two units about an edge of this unit. Both possibilities are known for conventional bending straps of metal.

A further embodiment of the invention provides that a compression of the at least one energy absorption part composed of a magnetorheological elastomer takes place, wherein this compression takes place through a compression part which in the event of a crash becomes displaced with respect to this energy absorption part. The compression part can, for example, become displaced in the longitudinal direction of the steering spindle and can herein act onto at least one surface of the energy absorption part, which surface extends in the longitudinal direction of the steering spindle such that it compresses this. The compression of the energy absorption part consequently takes place transversely to the direction of motion of the compression part in the event of a crash, thus transversely to the longitudinal direction of the steering spindle.

A further embodiment of the invention provides that in at least one energy absorption part, composed of a magnetorheological elastomer, are embedded preferably rod-form resistance elements, which project with their free ends from the energy absorption part. Cooperating with them is a thrust part which in a displacement of the supporting unit with respect to the mounting unit, abuts the projecting segments of the resistance elements such that these are deflected with the deformation of the magnetorheological material. By means of a variable magnetic field, the work performed therein is settable.

Magnetorheological elastomers are known. Reference is made, for example, to the following publications and the publications cited in them: Journal of the Mechanics and Physics of Solids 52 (2004) 2869-2908, "On finitely strained magnetorheological elastomers", S. V. Kankanala et al. (ELSEVIER); Polymer Testing 23 (2004) 347-353, "Magnetoactive elastomer composites", M. Farshad et al. (ELSEVIER); Polymer Testing 24 (2005) 163-168, "Compression properties of magnetostrictive polymer composite gels", M. Farshad et al. (ELSEVIER).

Figure 2:
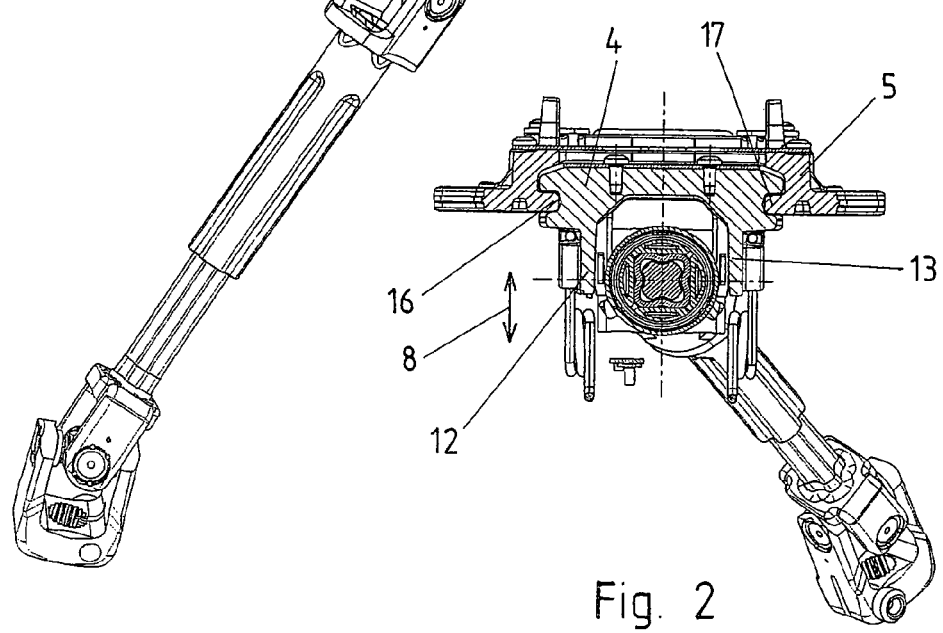
Figure 15:
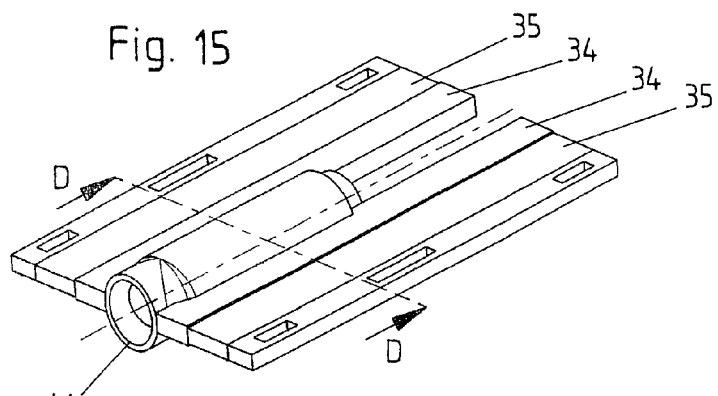
Figure 16:
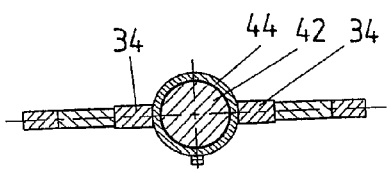
Figure 17:
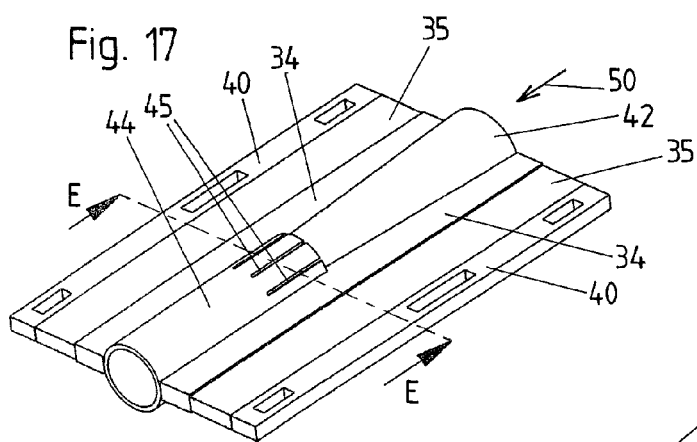
Figure 18:
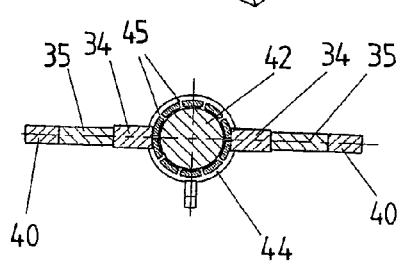
Figure 19:
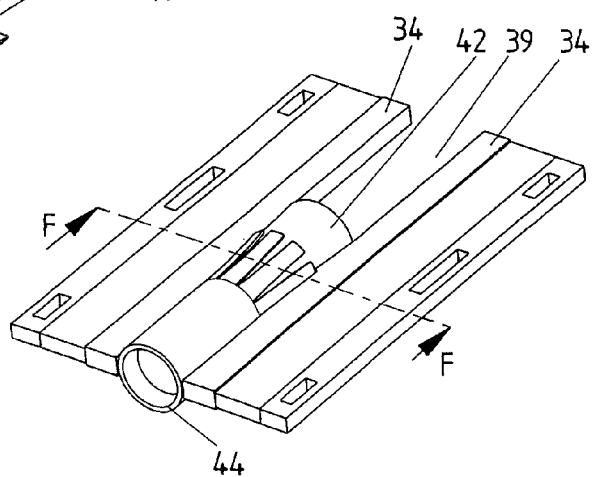
Figure 20:
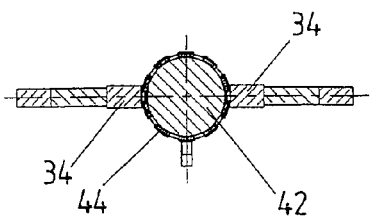
Figure 29:
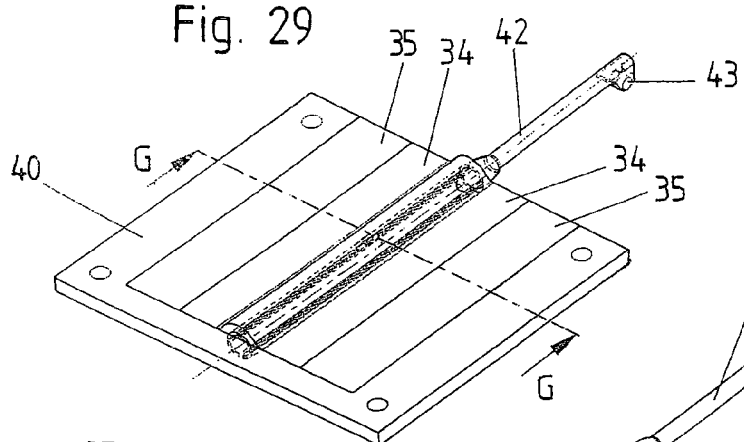
Figure 30:
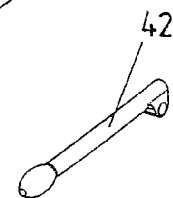
Figure 31:
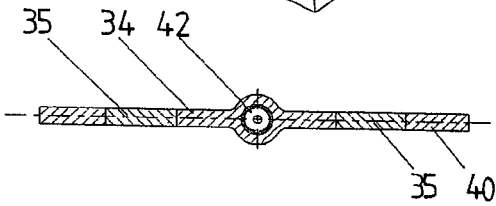
Figure 32:
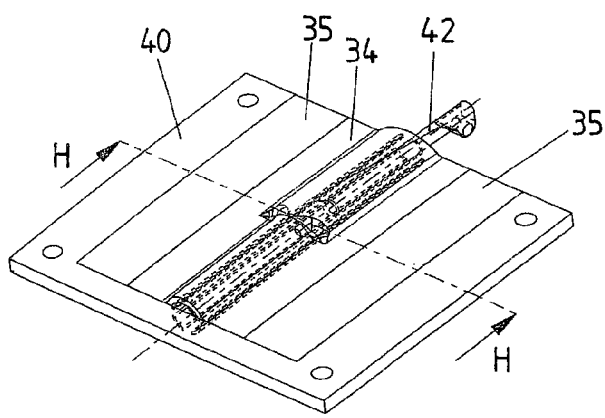
Figure 33:
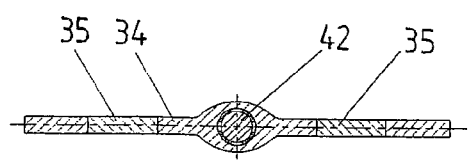
Figure 34:
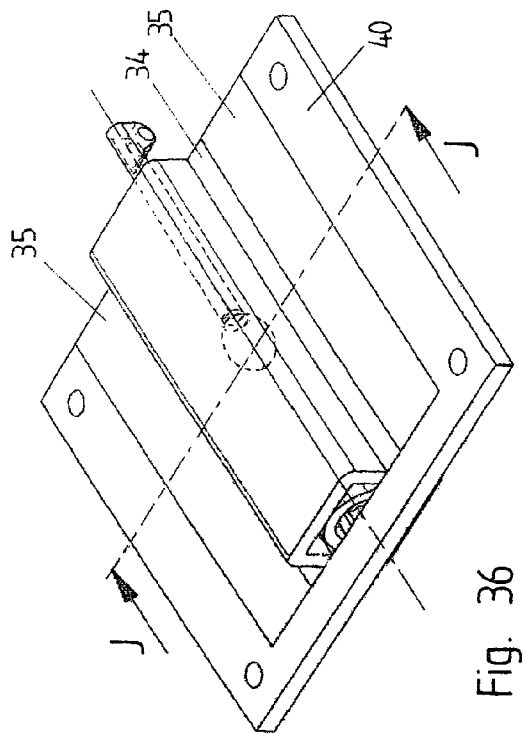
Figure 35:
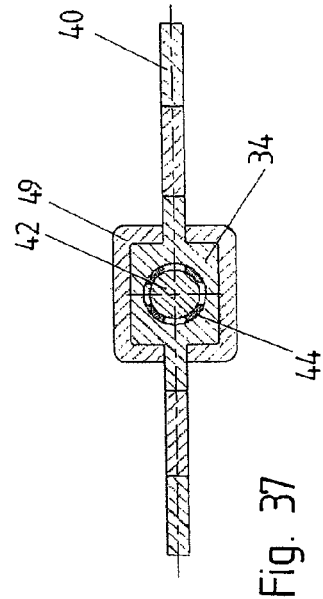
Figure 36:
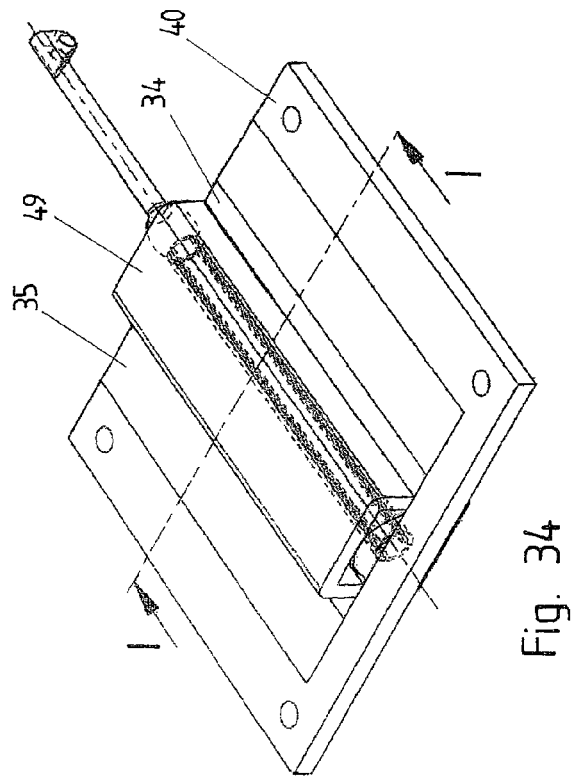
Figure 37:
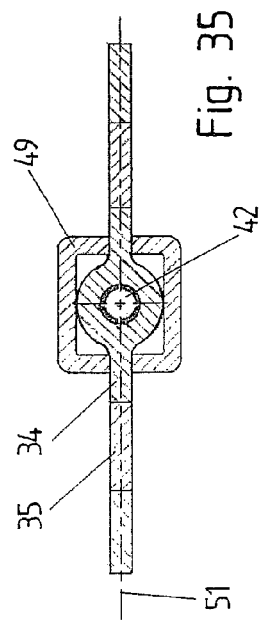

Further advantages and details of the invention will be explained in the following in conjunction with the enclosed drawing. In the drawing depict:

FIG. 1 an embodiment example of a steering column with an energy absorption device according to prior art in oblique view, FIG. 2 a section along line A-A of FIG. 1, FIG. 3 an oblique view of an energy absorption device according to the invention, FIG. 4 an oblique view of the energy absorption device of FIG. 3 seen from a different viewing direction, FIG. 5 a section along line B-B of FIG. 3, wherein additional parts of the steering column are also shown schematically, FIG. 6 and FIG. 7 oblique views from different viewing angles of a modified embodiment of the energy absorption device according to the invention, FIG. 8 and FIG. 9 oblique views from different viewing directions of a third embodiment variant of an energy absorption device according to the invention, FIG. 10 an oblique view of a fourth embodiment variant of an energy absorption device according to the invention, FIG. 11 an oblique view of the compression part, FIG. 12 an oblique view corresponding to FIG. 10 after a crash, FIG. 13 an oblique view of a fifth embodiment variant of an energy absorption device according to the invention, FIG. 14 a section along line C-C of FIG. 13, FIG. 15 the energy absorption device of FIGS. 13 and 14 after a crash, FIG. 16 a section along line D-D of FIG. 15, FIG. 17 an oblique view of a sixth embodiment variant of an energy absorption device according to the invention, FIG. 18 a section along line E-E of FIG. 17, FIG. 19 an oblique view of the energy absorption device of FIG. 17 after a crash, FIG. 20 a section along line F-F of FIG. 19, FIG. 21 an oblique view of a seventh embodiment variant of an energy absorption device according to the invention, FIG. 22 the energy absorption device of FIG. 21 after a crash, FIG. 23 an oblique view of an eighth embodiment variant of an energy absorption device according to the invention, FIG. 24 the energy absorption device of FIG. 23 after a crash, FIG. 25 an oblique view of a ninth embodiment variant of an energy absorption device according to the invention, FIG. 26 the energy absorption device of FIG. 25 after a crash, FIG. 27 an oblique view of a tenth embodiment variant of an energy absorption device according to the invention, FIG. 28 the energy absorption device of FIG. 27 after a crash, FIG. 29 an oblique view of an eleventh embodiment variant of an energy absorption device according to the invention, FIG. 30 the compression part of the energy absorption device of FIG. 29, FIG. 31 a section along line G-G of FIG. 29, FIG. 32 the energy absorption device of FIG. 29 after a crash, FIG. 33 a section along line H-H of FIG. 32, FIG. 34 an oblique view of a twelfth embodiment variant of an energy absorption device according to the invention, FIG. 35 a section along line I-I of FIG. 34, FIG. 36 the energy absorption device of FIG. 34 after a crash, FIG. 37 a section along line J-J of FIG. 36.

FIGS. 1 and 2 depict an embodiment example of a steering column with a conventional energy absorption device. The steering column comprises a steering spindle 1 including several steering spindle parts, each of which forms a segment of the longitudinal extent of the steering spindle, and on the driver-side end 2 of which a (not shown) steering wheel can be affixed in place. The segment of the steering spindle 1 adjoining this end 2 is rotatably supported in a jacket tube 3. The jacket tube 3, and consequently also the steering spindle 1 (at least in this segment), is supported by a supporting unit 4, which, in turn, is connected with a mounting unit 5, wherein the mounting unit 5 is to be disposed on the chassis of the motor vehicle, for example by means of threaded bolts penetrating bores 6.

The depicted embodiment example of the steering column adjustable in the longitudinal direction 7 (=the axial direction) of the steering spindle 1, which is indicated in FIG. 1 by a double arrow, and in inclination or height, wherein this adjustment direction 8 is shown in FIG. 2 by a double arrow. Steering columns adjustable in length and/or inclination or height are known in various implementations. In the depicted embodiment example a clamp mechanism 9 is provided acting under frictional closure, in the opened state of which the jacket tube 3 is displaceable with respect to the supporting unit 4 in the longitudinal direction 7 of the steering spindle 1 and into the adjustment direction 8 and in the closed state of the which the jacket tube 3 is tightened with the supporting unit 4. For opening and closing of the clamp mechanism 9 serves a clamp lever 10. The clamp mechanism 9 includes a clamp bolt 11 which penetrates elongated holes in side jaws 12, 13 of the supporting unit 4 and in the jacket tube 3. The jacket tube 3 is located between the side jaws 12, 13 of the supporting unit 4 and the elongated holes, oriented parallel to the displacement directions, in the side jaws 12, 13 and in the jacket tube 3 intersect one another. Furthermore for the provision of additional frictional faces lamellae 14, 15 are provided on at least one of the side jaws 12, 13 and on the jacket tube 3 lamellae which penetrate one another intersecting one another sandwich-like in the manner of a lamella coupling. Such displacement devices are known and the displacement device does not need to be explained here in further detail. Instead of a displacement device acting under frictional closure, displacement devices acting under form closure could also be employed, such as are also known. Combinations of displacement devices acting under frictional closure and under form closure have also been already proposed and could be employed.

The supporting unit 4 is connected with the mounting unit 5 through a displacement guide, through which the supporting unit 4 is guided displaceably with respect to the mounting unit 5 in the longitudinal direction 7 of the steering spindle 1. The supporting unit 4 could consequently also be denoted as a slide guided by the mounting unit 5. In the depicted embodiment example the supporting unit 4 comprises for this purpose grooves extending on both sides in the longitudinal direction 7 of the steering spindle 1, into which grooves engage projections 16, 17 directed opposite to one another of the mounting unit 5. Other implementations for a displacement guide of the supporting unit 4 with respect to the mounting unit 5 in the longitudinal direction 7 of the steering spindle are also conceivable and feasible, for example on the supporting unit 4 could also be disposed projections directed away from one another, which engage into longitudinal grooves of the mounting unit 5.

Between the mounting unit 5 and the supporting unit 4 act further an energy absorption device 18, which in the depiction according to FIGS. 1 and 2 is implemented in conventional manner and formed by a sheet metal part 19 with a bent-over end section 20. The main section of the sheet metal part 19 is secured on the mounting unit 5 by means of bolts 21, 22. The bent-over end section 20 is secured on the supporting unit 4 by means of bolts 23 penetrating bores. Furthermore are provided scorings 24 extending in the longitudinal direction 7.

During normal operation the sheet metal part 19 prevents the displacement of the supporting unit 4 with respect to the mounting unit 5. In the event of a crash, a force directed onto the supporting unit 4 in the direction toward the front end of the steering spindle 1 (which is located opposite the steering wheel-side end 2) and acting onto the supporting unit 3 can rip and tear the sheet metal part 19 along the scorings 24 and the supporting unit 4 can be displaced with respect to the mounting unit 5, wherein by bending the sheet metal part 19 bending work is performed. The bending axis of the sheet metal part 19 herein becomes displaced in the direction toward the front end of the steering column. Through the tearing open in combination with the bending of the sheet metal part 19, energy is absorbed under control. Through the bending, the major portion of the energy absorption is applied. During the displacement of the supporting unit 4 with respect to the mounting unit 5 the at least two steering spindle parts which are visible in section in FIG. 2 are telescopably slid one into the other.

An energy absorption device 18 according to the invention, which is employed in a steering column according to the invention instead of the previously described conventional energy absorption device 18, is shown in FIGS. 3 to 5. The steering column for the remainder can be implemented in the same manner as shown in FIGS. 1 and 2 and described previously. Parts of the steering column especially relevant in connection with the invention are again shown schematically in FIG. 5.

The energy absorption device 18 according to FIGS. 3 to 5 comprises a support part 25 with a bent-over end section 26, wherein the end section 26 is connected via a bent section with a main section of the support part 25. The bent section is bent over 180 degrees wherein it preferably has a uniform bending radius.

The main section for the securement on the mounting unit 5 can comprise, for example, bores 29, 30 through which it can be secured in position by means of bolts 27, 28 on the mounting unit 5. The end section 26 for the securement on the supporting unit 4 can comprise, for example, at least one bore 31, through which it can be secured by means of a bolt 32 on the supporting unit 4.

On a main side of the support part 25 are provided scorings 33 extending in the longitudinal direction 7 of the steering spindle 1, which scorings form tear-open lines with the displacement of the supporting unit 4 with respect to the mounting unit 5. The end section 26 is herein narrower than the main section of the support part 25 and the scorings 33 continue the width of the end section 26 across the main section.

The energy absorption device 18 includes furthermore two energy absorption parts 34, which are each formed in the shape of a strip-form plate extending in the longitudinal direction 7 of the steering spindle 1 and disposed on the support part 25 in contact on it with one of its main faces, i.e. the energy absorption device is formed in two-layers in the region of the energy absorption parts 34. The energy absorption parts extend over the main portion, the bent section and the bent-over end section 26, and are bent over the same bending axis 37 as the support parts 25, which axis is located at right angles to the steering spindle 1. The energy absorption parts 34 are composed of a magnetorheological elastomer. The elasticity or rigidity of the energy absorption parts 34 are consequently variable through a magnetic field of variable strength.

Further are disposed on the support part 25 electromagnets 35. These serve for acting on the energy absorption parts 34 with an adaptable magnetic field. Segments of connection lines 36 for the power supply of the electromagnets 35 are drawn in the FIGS. 3 and 5.

The two electromagnets 35 in the depicted embodiment example are disposed laterally next to the scorings 33 in a region of the support part 25 not bent during the displacement of the supporting unit 4 with respect to the mounting unit 5. For example, the electromagnets 35 are formed in the shape of strips in order to be able 34 with a magnetic field of appropriate strength to act onto as large a section as possible of each energy absorption part.

The energy absorption device 18 prevents in normal operation a displacement of the supporting unit 4 with respect to the mounting unit 5. In the event of a crash, the holding force of the energy absorption device 18 is exceeded and a displacement of the supporting unit 4 with respect to the mounting unit 5 can occur. The direction of motion 50 of the supporting unit 4 located parallel to the longitudinal direction 7 of the steering spindle 1 is shown by an arrow in FIG. 5. The support part 25 thereby increasingly rips and tears along the scorings 33 and the bent-over section of support part 25 is displaced in the direction toward the front end of the steering spindle 1. Herein the bent-over region of a particular energy absorption part 34 is also displaced, which part is bent, together with the support part 25, in the direction toward the front end of the steering spindle 1. Through the tearing open of the support part 25 and the bendings of the support part 25 and the energy absorption parts 34, energy is consequently absorbed in the displacement of the supporting unit 4 with respect to the mounting unit 5. The magnitude of the energy absorption is herein settable by means of the electromagnets 35. Through a variation of the magnetic field with which the energy absorption parts 34 are acted upon, the elasticity of the energy absorption parts 34 can be varied. Through such an effect on the rigidity of the energy absorption parts 34, the force can be affected which is required for their bending and, consequently, the energy absorbed in the bending.

The magnetic field, with which the energy absorption parts 34 are acted upon, can be set for example as a function of the weight of the driver. For this purpose in the driver seat a weight sensor can be disposed and the magnitude of the magnetic field can be adapted in specified manner as a function of the output value of the weight sensor. An optimal energy absorption for drivers with differing body weight can thereby be attained.

Further parameters which can be drawn on for setting the strength of the magnetic field are, for example, the state of whether or not the driver is using his seat belt, the vehicle speed, the impact angle, the seating position of the driver (for example by means of a camera and an image evaluation), etc. These parameters can be drawn on singly or in various combinations, in addition to the driver weight, or also instead of it, for setting the energy absorption.

However, in particular the magnetic field, and therewith the energy absorbed during the bending, can also be varied during the crash, and therewith a defined force progression can be set.

Instead of two energy absorption parts 34 bent over together simultaneously with the support part 25 of magnetorheological elastomer, there can also be utilized more than two or only one such energy absorption part. In the embodiment example according to the FIGS. 3 to 5 a "free bending" of the support part 25 takes place together with the at least one energy absorption part 34. Instead, the support part 25 and the energy absorption part 34 can also be pulled about an edge. The end section 26 of the support part 25 could, for example, also be secured on one of the two units 4 or 5 and the bent-over portion be pulled about an edge of the other of the two parts when the supporting unit 4 is displaced with respect to the mounting unit 5.

The electromagnets 35 could also be disposed in a different manner, and more than two or only one electromagnet 35 could be provided. Other means, devices or units for the generation of a variable magnetic field could also be employed, for example permanent magnets variable in their position with respect to one another.

A further embodiment of an energy absorption device according to the invention, which can be utilized for example in the steering column depicted in FIGS. 1 and 2, is shown in FIGS. 6 and 7. The support part 25 is implemented in the same manner as in the previously described embodiment. On the support part in this embodiment only a single plate-form energy absorption part 34 of magnetorheological elastomer is disposed, which, in the nondeformed state of the energy absorption device, is formed planarly and which extends up to the bent-over section of the energy absorption part. In the event of a crash the energy absorption part 34 again bends together with the support part 25 about a common bending axis 37.

In the further embodiment variant depicted in FIGS. 8 and 9 again two strip-form energy absorption parts 34 of magnetorheological elastomer are disposed on the support part 25, which, in the nondeformed state of the energy absorption device, extend up to the bent region of the support part 25, and here comprise an end bead 38. Here also, in the event of a crash, occurs a common bending of the energy absorption parts 34 and of the support part 25.

However, in principle it is feasible to omit the support part 25 and to deform only the elastomer. By means of breakaway rivets, capsules or clamps, which in the normal case hold the supporting unit 4 with respect to the mounting unit 5, a desired breakaway torque can be attained.

FIGS. 10 to 12 depict a further embodiment example of an energy absorption device according to the invention, which, for example, can be applied in the steering column shown in FIGS. 1 and 2. In this embodiment two energy absorption parts 34 of magnetorheological elastomer are provided which enclose a slot-form interspace 39 between them, which slot extends in the longitudinal direction 7 of steering spindle 1. The energy absorption parts 34 are secured in position, by means of a frame-shaped holding part 40, in which they are disposed, on the mounting unit 5 such that they are nondisplaceable in the longitudinal direction 7 of steering spindle 1. The holding part 40 is secured on the mounting unit 5; it comprises, for example, for this purpose bores 41 which serve for the securement on the mounting unit 5 by means of bolts.

By the holding part 40 is further held at least one electromagnet 35, in the depicted embodiment example two electromagnets 35, in order to act onto the energy absorption parts 34 with an adaptable magnetic field. These electromagnets 35 are only shown schematically in FIGS. 10 and 12.

A compression part 42 is so secured on the supporting unit 4 that it is nondisplaceable in the longitudinal direction 7 of the steering spindle 1 with respect to the supporting unit 4. For this purpose serves, for example, a bore 43 which is penetrated by a transverse bolt (not shown in FIGS. 10 to 12) secured on the supporting unit 4. On the side facing the interspace 39 the compression part is provided with a wedge-form tapering. If, in the event of a crash, the supporting unit 4 is displaced with respect to the mounting unit 5 (in the direction of motion 50 parallel to the longitudinal direction 7 of the steering spindle 1), the compression part 42 drives into the slot-form interspace 39 between the energy absorption parts 34 and herein widens it under the compression of the material of the energy absorption parts 34. This means that the compression of the energy absorption part 34 through the driving-in of the compression part 42 takes place in the direction transversely to the longitudinal direction 7 of the direction of motion 50 of steering spindle 1. This driven-in state is shown in FIG. 12, wherein for clarification the interspace 39 is shown widened over the entire length over which the compression part 42 has driven into this interspace. In fact, the widening is going to form inversely again behind the driven-in compression part 42 due to the elasticity of the energy absorption parts 34.

By means of the electromagnets 35 the elasticity or rigidity of the energy absorption parts 34, and consequently the work required for the compression of the energy absorption parts 34, can be adapted in order to set the energy absorption to the desired value.

Instead of two separate energy absorption parts 34 enclosing the interspace 39 between them, it would also be feasible to provide one slot in a single energy absorption part 34, into which slot drives in the compression part 42 in the event of a crash.

In the embodiment variant depicted in FIGS. 13 to 16 of the invention, the energy absorption occurs also under the compression of at least one energy absorption part 34 composed of a magnetorheological material. In contrast to the previously described embodiment example, here a guide part 44 is provided in the interspace 39 for the compression part 42. The guide part exhibits a receiving space open in the direction toward the compression part 42 for the compression part 42. In the embodiment example it has an oval cross section in the undeformed state, as is evident in FIG. 14, while the compression part 42 has a circular cross section with a diameter which, apart from play, corresponds to the inner diameter along the large longitudinal axis of the guide part 44. On its end facing the guide part the compression part 42 has a tapering with a running-in slope.

In the event of a crash, when the supporting unit 4 is displaced with respect to the mounting unit 5, the compression part 42 runs into the guide part 44 and deforms it to a shape corresponding to its outer contour (cf. FIGS. 15 and 16). The energy absorption parts 34, disposed on both sides of the guide part 44, or the sections on both sides of the guide part 44 of a single energy absorption part 34 having a slot, are herein compressed. The work performed herein can be adapted to the requirements by variation of a magnetic field, in particular by means of electromagnets 35.

Within the scope of the invention are various dispositions of the energy absorption part 34 with respect to the position of the steering column installed in the motor vehicle. For example, two energy absorption parts 34 can be disposed spaced apart in the direction transversely to the adjustment direction 18 with respect to the height of the steering column to the steering spindle. However, it is also conceivable and feasible to provide only one or more than two energy absorption parts 34. Alternatively, the energy absorption part can be disposed spaced apart from the steering spindle in the direction of the adjustment direction 18 with respect to the height of the steering column. In both cases a simple integration of the particular energy absorption parts 34 into the mounting unit 5 is feasible. In the case the supporting unit 4 does not become displaced in the event of a crash with respect to the mounting unit 5, the energy absorption part could, moreover, also be integrated into the supporting unit 4. Herein, in the simplest case, the elongated holes located parallel to an adjustment direction can be delimited by corresponding magnetorheological elastomers and therewith form the energy absorption part. In the simplest case the clamp bolt 11 accordingly serves as the compression part 42. In the event the clamp mechanism of the steering column is opened, an appropriate energization of the coils which activate the magnetorheological elastomer is interrupted or the appropriate energization is exclusively switched on in the event of a crash. A combination of the highly diverse discussed variants is simply conceivable and feasible.

An embodiment example similar to the previously described embodiment example is depicted in FIGS. 17 to 20. The compression part 42 is here overall formed conically and the guide part 44 with the circular cross section comprises on the side facing the compression part 42 axial slittings 45. When the compression part 42 runs into the guide part 44, again the compression of the material of the at least one energy absorption part 34 occurs.

In the embodiment examples described in FIGS. 10 to 20 on only one side of the compression part could be provided an energy absorption part 34 compressed by the compression part 42 during the displacement of the supporting unit 4 with respect to the mounting unit 5.

It is also conceivable and feasible to form in these embodiment examples the compression part 42 of a magnetorheological elastomer and the energy absorption part 34 of a non-magnetorheological material. The compression part 42 would in this case also represent an energy absorption part.

A further embodiment example of an energy absorption device according to the invention, which can be employed, for example, in the steering column depicted in FIGS. 1 and 2, is shown in FIGS. 21 and 22. FIG. 21 shows the starting state. In an interspace between two energy absorption parts 34 of magnetorheological elastomer a compression part 42 is disposed which is here implemented in the form of a band. The energy absorption parts 34 are fastened by means of holding parts 40 on the mounting unit 5, and on both sides of the energy absorption parts 34 are again disposed electromagnets 35. The one end of the band-form compression part 42 is secured on a securement part 46 nondisplaceably connected with the holding part 40. The other end of the compression part 42 is secured on the supporting unit 4. The interspace 39 and the compression part 42 guided through it have a waveform course in the starting state, cf. FIG. 21.

In the event of a crash a movement of the end of the compression part 42 connected to the supporting unit 4 occurs in the direction of motion 50. Thereby the compression part 42 is stretched while its corrugation or wavy shape is diminished such that it at least section-wise is displaced into a horizontal direction angularly to the longitudinal direction 7 of the steering spindle 1, resulting in a compression of the energy absorption parts 34.

The interspace in which the compression part 42 is guided could, again, be formed by a slot in a single energy absorption part 34.

A similar embodiment is depicted in FIGS. 23 and 24. Again, a band-form compression part 42 is guided in an interspace 39 with a winding or wavy course. The compression part 42 is here contorted so strongly that it has a retrogressive segment. Thereby, during the stretching of the compression part, result also compression components which are oriented in the longitudinal direction 7 of the steering spindle 1.

The compression part 42 could here also be implemented as a magnetorheological elastomer and form an energy absorption part, while the energy absorption part 34 is composed of a non-magnetorheological material.

In the embodiment example according to FIGS. 25 and 26 the compression part 42 is formed by a corrugated bellows. The energy absorption parts 34 of magnetorheological elastomer located on both sides of the corrugated bellows in the relieved starting state follow the wave-form course of the corrugated bellows, cf. FIG. 25. In the event of a crash the corrugated bellows is stretched, wherein its corrugation is flattened and the bellows compresses the two energy absorption parts 34 located on both sides of it.

In the embodiment example depicted in FIGS. 27 and 28, embedded into the two energy absorption parts 34 of magnetorheological elastomer, which are connected through holding parts 40 with the mounting unit 5 of the steering column, are resistance elements 47, free segments of which project from the energy absorption parts 34. In the depicted embodiment example these resistance elements 47 are formed by flattened straight metal parts. The free ends of the resistance elements 47 embedded in one energy absorption part 34, with the free ends of the resistance elements 47 embedded in the other energy absorption part 34, enclose an interspace 48 between them. In the event of a crash with a displacement of the supporting unit 4 with respect to the mounting unit 5, a thrust part 52 can be driven into it (direction of motion 50), wherein the thrust part 52 has a greater width than the width of the interspace 48 in the relieved state of the energy absorption parts 34. The resistance elements 47 are consequently deflected when the thrust part 52 drives in, wherein the segment embedded in the energy absorption parts 34 deforms the material of the energy absorption parts 34 (under the compression and extension of the material). Energy is hereby absorbed. This energy absorption is settable by means of electromagnets 36.

In the depicted embodiment example the thrust part 52 comprises an enlarged head section, whose width is greater than the width of the interspace 48, and adjoining thereon a neck section, whose width is less than the width of the interspace 48. The resistance elements 47 can consequently, after the passage of the head section, reset again into their original position due to the elasticity of the energy absorption parts 34.

Similarly as in the case of the embodiment examples according to FIGS. 13 to 20, in the embodiment example depicted in FIGS. 29 to 33, in the event of a crash a compression part 42 drives in with the compression of the material of the energy absorption part 34. The energy absorption part 34 composed of magnetorheological elastomer, however, in this embodiment comprises an inner hollow volume into which drives the compression part 42. In this hollow volume is disposed a guide part 44, which is formed by a small tube slotted into several segments in the longitudinal direction. When the compression part 42 drives in, the guide part 44 is widened and on both sides of the guide part 44 the material of the energy absorption part 34 is compressed.

FIG. 34 shows a similar embodiment example, wherein, however, in the proximity of the hollow volume of the energy absorption part 34, additional holding parts 49 are provided which enclose the energy absorption part 34. Thereby a hollow chamber enclosed by the holding parts 49 is formed such that when the compression part 42 drives in, a compression of the material of the energy absorption part 34 results parallel and perpendicularly to a plane 51. Through a variation of the magnetic field acting upon the energy absorption part 34 the absorption energy consumed herein can again be set.

The energy absorption parts 34 in all of the described embodiment examples are preferably composed of a magnetorheological elastomer, whose elasticity changes as a function of the magnetic field acting upon it. It is however also conceivable and feasible to form the compression part 42 of a magnetorheological elastomer, wherein the compression part 42 forms an energy absorption part, and/or the energy absorption part 34 is formed of a non-magnetorheological material.

In all of the embodiments described, the connection with the mounting unit 5 and the supporting unit 4 can also be interchanged, i.e. the part (main portion of the support part 25 or holding part 40) secured on the mounting unit 5 can be secured on the supporting unit 4 and the part (bent-over section 26 of support part 25 or compression part 42 or thrust part 52 secured on the supporting unit 4 can be secured on the mounting unit 5.

Instead of at least one electromagnet 35, another means for generating a variable magnetic field could also be utilized, for example permanent magnets which are variable in their position with respect to one another.

Even if the invention has been described in connection with a steering column adjustable in length as well as also in inclination or height, the invention can also be utilized in a steering column adjustable only in one adjustment direction or in a nonadjustable steering column.

LEGEND TO THE REFERENCE NUMBERS

1 Steering spindle
2 End
3 Jacket tube
4 Supporting unit
5 Mounting unit
6 Bore
7 Longitudinal direction
8 Adjustment direction
9 Clamp mechanism
10 Clamp lever
11 Clamp bolt
12 Side jaw
14 Lamella
15 Lamella
16 Projection
17 Projection
18 Energy absorption device
19 Sheet metal part
20 End section
21 Bolt
22 Bolt
23 Bolt
24 Scoring
25 Support part
26 End section
27 Bolt
28 Bolt
29 Bore
30 Bore
32 Bolt
33 Scoring
34 Energy absorption part
35 Electromagnet
36 Connection line
27 Bending axis
38 End bead
39 Interspace
40 Holding part
41 Bore 42 Compression part
43 Bore
44 Guide part
45 Slitting
46 Securement part
47 Resistance element
48 Interspace
49 Holding part
50 Direction of motion
51 Plane
52 Thrust part

The invention claimed is:

1. A steering column for a motor vehicle comprising:
a rotatably supported steering spindle,
a supporting unit supporting the steering spindle,
a mounting unit for securing the steering spindle on a chassis of the motor vehicle, the supporting unit, in the event of a crash, being displaceable with respect to the mounting unit, and
an energy absorption device configured to act between the supporting unit and the mounting unit for energy absorption when the supporting unit is displaced with respect to the mounting unit in the event of a crash,
wherein at least one energy absorption part of the energy absorption device, deformable when the supporting unit is displaced with respect to the mounting unit, is composed of a magnetorheological elastomer, and the energy absorption device includes a unit configured to generate a magnetic field, the energy absorption part composed of the magnetorheological elastomer is capable of being acted upon at least regionally with a variable magnetic field.

2. The steering column as claimed in claim 1, wherein the unit configured to generate the magnetic field includes at least one electromagnet.

3. The steering column as claimed in claim 1, wherein the energy absorption part composed of a magnetorheological elastomer undergoes bending in the displacement of the supporting unit with respect to the mounting unit.

4. The steering column as claimed in claim 3, wherein the energy absorption part is formed in the shape of a plate or in the form of a strip extending in the longitudinal direction of the steering spindle and the bending in the displacement of the supporting unit with respect to the mounting unit takes place about a bending axis at right angles to the longitudinal direction of the steering spindle.

5. The steering column as claimed in claim 4, wherein the energy absorption part is disposed on a support part which is connected, with the supporting unit and with the mounting unit.

6. The steering column as claimed in claim 5, wherein the bending of the energy absorption part takes place together with a bending of the support part.

7. The steering column as claimed in claim 5, wherein the support part is formed in the shape of a plate and a main section of the support part is disposed on the mounting unit or on the supporting unit and a bent-over end section of the support part is disposed on the other of these two units.

8. The steering column as claimed in claim 1, further comprising a compression part which, during the displacement of the supporting unit with respect to the mounting unit, moves with respect to the at least one energy absorption part composed of a magnetorheological elastomer, and which brings about a compression of the energy absorption part.

9. The steering column as claimed in claim 8, wherein the compression part during the displacement of the supporting unit with respect to the mounting unit is displaced in the longitudinal direction of the steering spindle.

10. The steering column as claimed in claim 9, wherein the compression part has a front end the front end being relative to the compression part direction of displacement with respect to the energy absorption part, and comprising a tapering.

11. The steering column as claimed in claim 8, wherein the compression part is configured to act on at least one surface extending in the longitudinal direction of the steering spindle of the energy absorption part so as to result in a compression.

12. The steering column as claimed in claim 8, wherein the compression part, at least during one segment of its displacement with respect to the at least one energy absorption part, is located in an interspace or hollow volume extending in the longitudinal direction of the steering spindle between two energy absorption parts or in a longitudinal slot extending in the longitudinal direction of the steering spindle or hollow volume of a single energy absorption part.

13. The steering column as claimed in claim 12, wherein in the interspace, hollow volume or longitudinal slot at least one guide part for the compression part is disposed, which is interspaced between the compression part and the at least one energy absorption part.

14. The steering column as claimed in claim 13, wherein the guide part comprises a receiving volume for the compression part, into which the compression part drives in during the displacement of the supporting unit with respect to the mounting unit with the deformation of the guide part.

15. The steering column as claimed in claim 8, wherein the compression part, during a displacement of the supporting unit with respect to the mounting unit, is at least section-wise displaced into a direction which is horizontally at an angle to the longitudinal direction of the steering spindle.

16. The steering column as claimed in claim 15, wherein the compression part is formed by a band which is guided in an interspace between two energy absorption parts composed of a magnetorheological elastomer or in a slot of a single energy absorption part composed of a magnetorheological elastomer, wherein this interspace or slot comprises at least one curvature, and the band is held with its one end on the mounting unit or the supporting unit such that it is nondisplaceable in the longitudinal direction of the steering spindle, and with its other end nondisplaceably in the longitudinal direction of the steering spindle on the other of these two units.

17. The steering column as claimed in claim 16, wherein this interspace or slot comprises several oppositely directed curvatures.

18. The steering column as claimed in claim 15, wherein the compression part is formed by a corrugated bellows disposed in the interspace between two energy absorption parts composed of a magnetorheological elastomer, or in a slot of a single energy absorption part composed of a magnetorheological elastomer and connected with its one end nondisplaceably in the longitudinal direction of the steering spindle with the mounting unit or the supporting unit and with its other end connected nondisplaceably in the longitudinal direction of the steering spindle with the other of these two units.

19. The steering column as claimed in claim 11, wherein in at least one energy absorption part composed of a magnetorheological elastomer resistance elements are embedded which project with their free ends from the energy absorption part, wherein the resistance elements are deflectable during the displacement of the support unit with respect to the mounting unit through a thrust part with the deformation of the material of the energy absorption part.

20. The steering columns as claimed in claim 11, wherein the supporting unit is configured to be guided so as to be displaceable with respect to the mounting unit by a displacement guide in the longitudinal direction of the steering spindle.

* * * * *